United States Patent
Howell et al.

(10) Patent No.: US 12,116,112 B2
(45) Date of Patent: Oct. 15, 2024

(54) AIRCRAFT BRAKING CONTROLLER AND SYSTEM

(71) Applicant: Airbus Operations Limited, Bristol (GB)

(72) Inventors: George Howell, Bristol (GB); Florian Becher, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 239 days.

(21) Appl. No.: 17/732,053

(22) Filed: Apr. 28, 2022

(65) Prior Publication Data

US 2022/0348318 A1 Nov. 3, 2022

(30) Foreign Application Priority Data

Apr. 29, 2021 (GB) .................................... 2106152

(51) Int. Cl.
*B64C 25/42* (2006.01)
*B64C 25/12* (2006.01)

(52) U.S. Cl.
CPC ............ *B64C 25/426* (2013.01); *B64C 25/12* (2013.01)

(58) Field of Classification Search
CPC ..... B64D 45/0005; B64C 25/10; B64C 25/12; B64C 25/426; B60T 17/22; B60T 8/1703; B60T 8/325
See application file for complete search history.

(56) References Cited

U.S. PATENT DOCUMENTS

| | | | | |
|---|---|---|---|---|
| 3,485,465 A | * | 12/1969 | Churchill | B64C 25/16 244/102 R |
| 4,714,298 A | * | 12/1987 | Mail | B60T 13/141 303/117.1 |
| 5,050,940 A | * | 9/1991 | Bedford | B60T 8/1703 303/68 |
| 5,745,053 A | * | 4/1998 | Fleming, III | B64C 25/28 340/963 |
| 6,513,885 B1 | * | 2/2003 | Salamat | B60T 8/1703 303/DIG. 9 |
| 6,704,634 B1 | * | 3/2004 | Gowan | B64C 25/426 244/50 |
| 7,618,100 B2 | * | 11/2009 | Griffith | B60T 8/1703 701/70 |
| 8,727,454 B2 | * | 5/2014 | DeVlieg | B60T 8/00 303/20 |
| 10,882,500 B2 | * | 1/2021 | Burte | B64D 45/00 |
| 10,933,982 B2 | * | 3/2021 | Hubbard | B60T 8/1703 |
| 11,572,045 B2 | * | 2/2023 | Gadd | B64C 25/42 |

(Continued)

FOREIGN PATENT DOCUMENTS

| | | |
|---|---|---|
| EP | 1 418 122 | 5/2004 |
| EP | 3 530 564 | 8/2019 |

(Continued)

OTHER PUBLICATIONS

EP 22 17 0206, European Search Report (Aug. 24, 2022)(9 pages).

*Primary Examiner* — Carl C Staubach
(74) *Attorney, Agent, or Firm* — Nixon & Vanderhye P.C.

(57) ABSTRACT

An aircraft braking controller for an aircraft, the aircraft braking controller configured to determine a position of at least a part of a landing gear of the aircraft during retraction of the landing gear into the aircraft, and control braking of a wheel of the landing gear based on the position determined.

14 Claims, 3 Drawing Sheets

(56) References Cited

U.S. PATENT DOCUMENTS

| | | | | |
|---|---|---|---|---|
| 2003/0011493 | A1* | 1/2003 | Wiplinger | B64C 25/28 340/960 |
| 2006/0027706 | A1* | 2/2006 | Lindahl | B64C 25/22 244/102 R |
| 2007/0175713 | A1* | 8/2007 | DeVlieg | B60T 8/1703 188/158 |
| 2008/0150353 | A1* | 6/2008 | Griffith | B60T 7/12 477/208 |
| 2013/0060404 | A1* | 3/2013 | Cahill | B60T 17/221 701/3 |
| 2015/0102163 | A1* | 4/2015 | Luce | B64C 25/60 91/418 |
| 2015/0367933 | A1* | 12/2015 | Li | F16F 9/0209 701/3 |
| 2017/0355473 | A1* | 12/2017 | Cahill | B64C 25/34 |
| 2018/0222575 | A1* | 8/2018 | Cepic | B64D 45/00 |
| 2018/0362151 | A1* | 12/2018 | Marles | B64C 25/16 |
| 2019/0263506 | A1* | 8/2019 | Hubbard | B64C 25/46 |
| 2019/0263511 | A1* | 8/2019 | Plude | B64C 25/42 |
| 2020/0079332 | A1* | 3/2020 | Gadd | B60T 8/1703 |
| 2020/0172066 | A1* | 6/2020 | Burte | B60T 8/1703 |

FOREIGN PATENT DOCUMENTS

| | | |
|---|---|---|
| EP | 3 530 565 | 8/2019 |
| EP | 3 659 877 | 6/2020 |
| EP | 3 702 270 | 9/2020 |
| WO | 2021/018622 | 2/2021 |

* cited by examiner

AIRCRAFT BRAKING CONTROLLER AND SYSTEM

RELATED APPLICATION

This application incorporates by reference and claims priority to United Kingdom Patent Application GB 2106152.8, filed Apr. 29, 2021.

TECHNICAL FIELD

The present invention relates to aircraft braking controllers, and aircraft braking systems comprising the aircraft braking controllers.

BACKGROUND

Some aircraft, particularly civil aircraft, comprise landing gears which are retractable, such as into a landing gear bay following a take-off event. It is desirable for the wheels of a landing gear to be stationary, or rotating with a low angular velocity, when the landing gear is stowed in the landing gear bay, in order to reduce a risk of damage to the aircraft.

In some aircraft, a retraction process is performed only after period of time has elapsed following a take-off event, thereby allowing the angular velocity of the wheels to slow prior to the retraction process. In other aircraft, a physical stop is provided in proximity to the landing gear bay to contact and slow or stop the wheels as they enter the landing gear bay.

SUMMARY

A first aspect of the present invention provides an aircraft braking controller for an aircraft, the aircraft braking controller configured to: determine a position of at least a part of a landing gear of the aircraft during retraction of the landing gear; and control braking of a wheel of the landing gear based on the position determined.

Optionally, the controller being configured to determine the position of the at least a part of the landing gear during retraction of the landing gear comprises the controller being configured to monitor the position of the at least a part of the landing gear during retraction of the landing gear, such as intermittently and/or continuously during retraction of the landing gear. In other words, the controller may be configured to determine the position of the at least a part of the landing gear plural times during retraction of the landing gear. Optionally, the controller being configured to control the braking of the wheel of the landing gear based on the position determined comprises the controller being configured to cause regulation of a rotational speed of the wheel, on the basis of the position monitored.

Optionally, the aircraft braking controller is configured to determine the position of at least the part of the landing gear during movement of the landing gear during a retraction process to move the landing gear from an extended position to a retracted position. Optionally, the extended position is a position of the landing gear during, or shortly before or after, a take-off event of the aircraft. In the retracted position, the landing gear may be stowed, or contained, in a landing gear bay of the aircraft.

By controlling the braking of the wheel based on the position determined, a more gradual braking force may be applied during the retraction process instead of, for example, applying a large braking force to the wheel prior to, or early in, the retraction process, such as when a landing gear bay door is opening. In this way, a reduced power draw may be achieved from a braking system power supply, and/or a retraction system power supply of the aircraft. This is particularly advantageous where a large power draw is required to move the landing gear during the retraction process. Specifically, a reduced power required for braking may lead to more power being available for moving the landing gear during the retraction process, and/or for other functions, such as to improve take-off performance. For instance, more power may be available to control surfaces of the aircraft, such as rudders, elevators and/or ailerons, which may improve the effectiveness and response time of the control surfaces. This may also allow the aircraft to take-off in more extreme environmental conditions. Alternatively, or in addition, a reduced power draw from the braking system power supply may allow a smaller power supply to be used, thereby reducing a weight of the aircraft.

Further advantageously, a reduced gyroscopic force may be achieved by braking the wheel more gradually during the retraction. This may reduce the power required to retract the landing gear, improve a safety of the aircraft and/or reduce loads on structural elements of the aircraft, which may improve a fatigue life of the structural elements.

Optionally, the aircraft does not comprise one or more physical stops for slowing and/or stopping the wheel during the retraction process. This may reduce a weight of the aircraft, and/or reduce wear of a tyre of the wheel which might otherwise occur if the tyre were to contact the physical stop while the wheel rotates.

Optionally, the position of the at least the part of the landing gear may be estimated based on an elapsed time since the start of the retraction process. Optionally, the controller is configured to determine the position of the at least the part of the landing gear on the basis of landing gear position information received from one or more sensors.

Optionally, the aircraft braking controller is configured to control the braking of the wheel of the landing gear based on the position determined and a determined status of a component of the landing gear. Optionally, the aircraft braking controller is configured to determine the status of the component.

Optionally, the status of the component is a status of the wheel, such as a status of a tyre of the wheel. Optionally, the status is a condition of the wheel, such as a condition of the tyre, such as the presence of a defect of the tyre. Optionally, the status is a pressure of the tyre, or a level of inflation of the tyre.

In this way, the aircraft braking controller may apply a higher level of braking to a wheel that is in a sub-optimal condition and/or a sub-optimal level of inflation. This may ensure the wheel is suitably slowed during the retraction process. This may be to account for a changing shape of the wheel or tyre, such as due to a change in tyre pressure and/or the presence of a defect of the tyre. This may improve a safety of the aircraft.

Optionally, the aircraft braking controller is configured to determine a target rotational speed of the wheel based on the position determined. Optionally, the aircraft braking controller is configured to determine the target rotational speed of the wheel based on the status determined. Optionally, the aircraft braking controller is configured to determine the target rotational speed based on both the position determined and the status determined.

Optionally, the aircraft braking controller is configured to control the braking of the wheel based on the target rotational speed. This may be an open-loop control of the braking based on the target rotational speed. For example, a lower target rotational speed may cause a higher braking force to be applied to the wheel, and a higher target rotational speed may cause a lower braking force to be applied to the wheel. This may lead to more accurate and reliable control of the braking of the wheel during the retraction process.

Optionally, the aircraft braking controller is configured to determine the target rotational speed on the basis of a predefined relationship between plural target rotational wheel speeds and plural positions of the landing gear.

Optionally, the relationship is a monotonically decreasing relationship, so that the target rotational wheel speed is reduced as the landing gear is retracted. Optionally, the relationship is a linear relationship. Optionally, the relationship is a nonlinear relationship, and the braking of the wheel is controlled to provide a desired power draw from a braking system power supply.

Optionally, the relationship is defined so that the target rotational speed is below a predetermined rotational speed threshold when the landing gear is at a critical position. Optionally, the critical position is a position of the landing gear at which a part of the landing gear, such as a part of the wheel, is in close proximity to a part of the aircraft, such as a part of a landing gear bay (such as a mouth of the bay). Ensuring the target rotational speed is below the rotational speed threshold at the critical point may reduce a risk of damage to the aircraft, for example due to the wheel rotating in proximity to the part of the aircraft.

Optionally, the aircraft braking controller is configured to vary the predefined relationship. Optionally, the aircraft braking controller is configured to vary the predefined relationship on the basis of the status of the component of the landing gear.

Optionally, this is by the aircraft braking controller varying a critical position of the landing gear at which the target rotational speed of the wheel is below a predefined threshold. Optionally, the aircraft braking controller may vary a shape of the predefined relationship, such as by changing how the target rotational speeds vary with the positions of the landing gear. Optionally, the controller may define a new relationship between plural target rotational speeds and plural positions of the landing gear. In this way, the target rotational speed may be varied to account for a changing shape of the tyre, such as due to a change in tyre pressure and/or the presence of a defect on the tyre, such as to ensure the wheel is slowed sufficiently before it is stowed in the landing gear bay.

Optionally, the aircraft braking controller is configured to determine a rotational speed of the wheel during the retraction of the landing gear.

Optionally, the controller is configured to perform an open-loop control of the braking of the wheel, such as without determining, or using, the rotational speed of the wheel. For example, the controller may be configured to perform such open-loop control based on one or any combination of: the position determined, the status determined, and the target rotational wheel speed. For example, the aircraft braking controller may be configured to estimate a required braking force on the basis of the position determined, the status determined, and/or the target rotational wheel speed.

Optionally, the aircraft braking controller is configured to compare the target rotational speed with the rotational speed of the wheel determined by the controller.

Optionally, the aircraft braking controller is configured to determine a difference, or a ratio, between the target rotational speed and the rotational speed of the wheel determined by the controller.

Optionally, the aircraft braking controller is configured to control the braking of the wheel based on the comparison.

Optionally, the controller is configured to control the braking of the wheel to reduce the difference, or ratio, between the target rotational speed and the rotational speed of the wheel determined by the controller.

That is, the controller may be configured to perform a closed-loop control of the braking of the wheel based on the wheel speed determined by the controller and the target rotational wheel speed. By determining and using the actual rotational speed of the wheel, it is not required to make conservative assumptions about the ability of the wheel to be braked. In other words, by determining, or monitoring, the rotational speed of the wheel, a more accurate control, or regulation, of the braking of the wheel may be achieved. This may reduce a power draw required to brake the wheel, leaving more power available for the retraction process or other functions, as described hereinbefore.

Optionally, the controller is configured to perform an open-loop control of the braking of the wheel, such as without comparing the target rotational wheel speed with the rotational wheel speed of the wheel determined by the controller and/or without determining, or using, the target rotational speed.

A second aspect of the present invention provides an aircraft braking system comprising the aircraft braking controller according to the first aspect, and one or more sensors for sensing the position of the at least the part of the landing gear during the retraction of the landing gear.

Optionally, the aircraft braking system is an aircraft retraction braking system.

Optionally, the controller is configured to determine the position of the landing gear on the basis of landing gear position information received from the one or more sensors. By using the one or more sensors, the position of landing gear position may be determined more accurately, leading to improved safety and/or more efficient braking during the retraction of the landing gear.

Optionally, the position of the at least the part of the landing gear is a position of a portion of the wheel, and the one or more sensors are configured to sense the position of the portion of the wheel.

This provides a more accurate determination of a distance of the rotating component—the wheel—from a part of the aircraft, thereby improving a safety of the aircraft braking system.

Optionally, the portion of the wheel defines a maximum radius of the wheel.

Optionally, the wheel comprises a tyre. The radius of the tyre may change depending on a level of inflation of the tyre and/or a speed of the tyre. Optionally, the tyre comprises a tyre body and a tyre portion, the tyre portion connected to the tyre body at a proximal end of the tyre portion and comprising a distal end defining the maximum radius of the wheel.

In this way, the braking of the wheel may be controlled based on a position of the maximum radius of the wheel, such as a proximity of the maximum radius from a part of the aircraft, or from a critical position of the landing gear. In this way, the controller may account for a change in the radius of the wheel due to a deformation of the tyre, and/or the presence of such a tyre portion, thereby improving the accuracy and safety of the aircraft braking system.

Optionally, the one or more sensors comprise any one or more of: an angular position sensor for sensing an angular position of the part of the landing gear; a linear position sensor for sensing a linear position of a part of the landing gear; and a proximity sensor, such as an infrared sensor, a laser, and/or a camera.

Optionally, the proximity sensor is for sensing a proximity of the part of the landing gear to a part of the aircraft, or to a critical position of the landing gear, or a part thereof.

Optionally, the aircraft braking system comprises a brake configured to apply a braking force to the wheel. Optionally, to control the braking of the wheel, the controller is configured to cause operation of the brake.

A third aspect of the present invention provides a method of controlling braking of a wheel of a landing gear of an aircraft, the method comprising: determining a position of at least a part of the landing gear during retraction of the landing gear; and controlling braking of the wheel of the landing gear based on the position determined.

Optionally, the determining the position of the at least a part of the landing gear during retraction of the landing gear comprises monitoring the position of the at least a part of the landing gear during retraction of the landing gear, such as intermittently and/or continuously during retraction of the landing gear. In other words, the method may comprise determining the position of the at least a part of the landing gear plural times during retraction of the landing gear. Optionally, the controlling the braking of the wheel of the landing gear based on the position determined comprises causing regulation of a rotational speed of the wheel, on the basis of the position monitored.

Optionally, the method comprises any of the actions performed by the aircraft braking controller of the first aspect and/or the aircraft braking system of the second aspect.

Optionally, an aircraft braking controller or aircraft braking system configured to perform the method of the third aspect comprises any of the optional features of the aircraft braking controller of the first aspect and/or the aircraft braking system of the second aspect.

A fourth aspect of the present invention provides a non-transitory computer-readable storage medium storing instructions that, when executed by a processor of an aircraft braking controller, cause the processor to perform the method of the third aspect.

A fifth aspect of the present invention provides an aircraft braking controller for an aircraft, the aircraft braking controller configured to: monitor a position of a landing gear of the aircraft during retraction of the landing gear; and cause regulation of a rotational speed of a wheel of the landing gear, on the basis of the position monitored.

Optionally, the aircraft braking controller comprises any of the optional features of the aircraft braking controller of the first aspect. Optionally, the aircraft braking system of the second aspect comprises the aircraft braking controller of the fifth aspect.

A sixth aspect of the present invention provides an aircraft comprising the aircraft braking controller according to the first or fifth aspects, the aircraft braking system of the second aspect, or the non-transitory computer-readable storage medium according to the fourth aspect.

Optionally, the aircraft comprises the landing gear.

BRIEF DESCRIPTION OF THE DRAWINGS

Embodiments of the invention will now be described, by way of example only, with reference to the accompanying drawings, in which.

DETAILED DESCRIPTION

Figure 1:
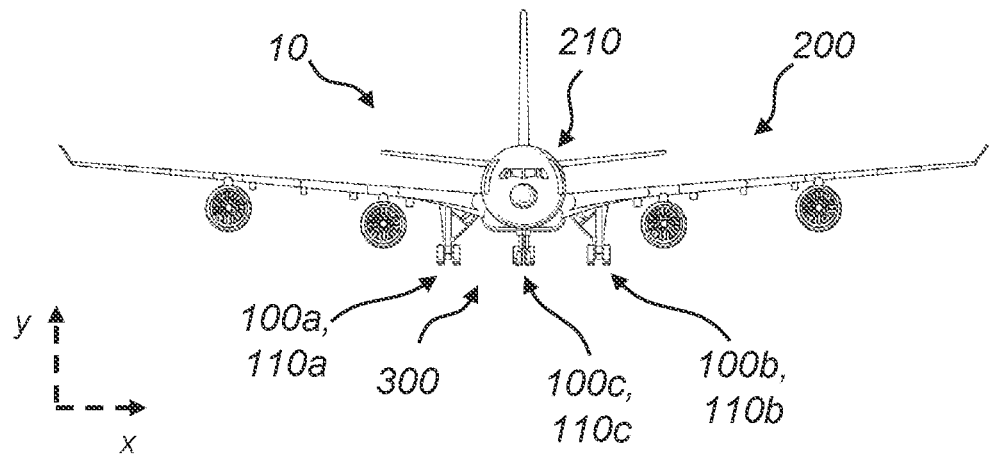
FIG. 1 shows a schematic view of an aircraft according to an example.

A commercial aircraft 10 is shown in FIG. 1. In other examples, the aircraft may be other than a commercial aircraft. The aircraft 10 comprises two main landing gears ('MLGs') 100*a*, 100*b* and a nose landing gear ('NLG') 100*c*, each landing gear 100*a*-100*c* comprising plural respective wheels 110*a*-110*c*. The aircraft 10 also comprises a braking system 200 comprising brakes (shown in FIG. 2) configured to apply braking forces to respective wheels 110*a*-110*b* of the MLGs 100*a*, 100*b*. In the present example, the wheels 110*c* of the NGL 100*c* do not comprise respective brakes. In other examples, the braking system 200 also comprises brakes for applying braking forces to the wheels 110*c* of the nose landing gear 100*c*.

The aircraft braking system 200 comprises a controller 210 configured to control the brakes of the braking system 200, as will be described in more detail hereinafter. In some examples, the controller 210 is a retraction braking control unit (RBCU) of the aircraft 10. In other examples, the controller 210 is a braking and steering control unit (BSCU) of the aircraft 10. The wheels 110*a*-110*c* that can be braked by the braking system 200 may herein be referred to as "braked wheels", and may be identified by the singular reference numeral 110 for brevity.

The brakes of the braking system 200 are hydraulically operated disc brakes, each comprising a stack of rotor and stator discs positioned within the hub of a braked wheel 110. Specifically, the rotor and stator discs are forced together, such as by a brake actuator, to develop a friction force between the rotor and stator discs. Other types of brake may be used in other examples, such as electrically operated disc brakes. As such, the term "braking", particularly when applied to a braked wheel 110, herein refers to applying a braking force, or braking torque, to the wheel 110, such as by brake actuator pressing rotor and stator discs together, or by any other suitable mechanism for slowing the braked wheel 110.

Figure 2:
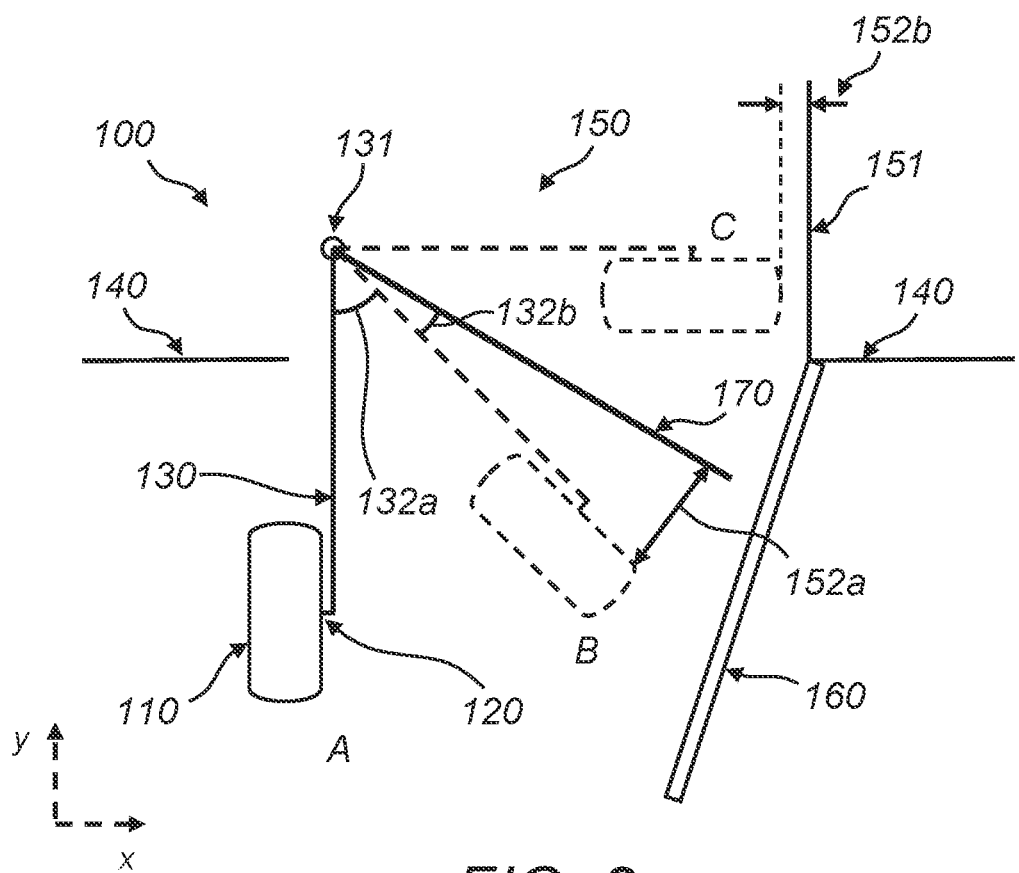
FIG. 2 shows a schematic view of a landing gear of the aircraft of FIG. 1.

The MLGs 100*a*-100*b* and NLG 100*c* are each retractable into respective landing gear bays (shown in more detail in FIG. 2). The aircraft 10 comprises a retraction system 300 configured to perform a retraction process to retract the MLGs 100*a*-100*b* and NLG 100*c* into the respective landing gear bays. The retraction system 300 of this example is a landing gear extension and retraction system (LGERS), but in other examples a different system may be provided for extending the landing gear. The retraction system 300 comprises suitable actuators (not shown), which may be hydraulic, pneumatic, electric, or electro-hydraulic actuators, for moving each of the landing gears 100*a*-100*c*, or parts thereof, during the retraction process. The retraction system 300 also comprises a controller (not shown) for controlling, such as causing actuation of, the actuators during the retraction process. It will be appreciated that, in some examples, the retraction system 300 is a part of the braking system 200, or the braking system 200 is a part of the retraction system 300, or the braking and retraction systems 200, 300 share one or more components, such as the controller 210.

The controller 210 is configured to determine a position of at least a part of the landing gear 100 during retraction of the landing gear 100, and to control braking of the braked wheel 110 on the basis of the position determined. Specifically, as will be described in more detail hereinafter, the controller 210 is configured to determine a target rotational speed of the wheel 110, which is predefined as a function of the landing gear 100 position, and cause braking of the wheel to slow the wheel towards the target rotational speed during the retraction process. By employing such a closed-loop control to brake the wheel 110, the rotational speed of the wheel 110 can be reduced gradually as the landing gear 100 is retracted, thereby requiring a reduced power draw compared to, for example, applying a fixed amount of braking prior to movement of the landing gear 100 during the retraction process.

Turning now to FIG. 2, shown is a schematic illustration of a landing gear, which is herein identified by the singular reference numeral 100. The landing gear 100 is any one of the MLGs 100a-100b or, in some examples, the NLG 100c, discussed above. The landing gear 100 comprises the wheel 110, which comprises a hub and a tyre (not shown in FIG. 2, but visible in FIG. 3), connected to the aircraft 10 at a pivot point 131 by a connection 130. The landing gear 100 is articulated around the pivot point 131 during a retraction process to bring the wheel 110 into the landing gear bay 150.

It will be appreciated that, in some examples, the connection 130 comprises any suitable linkage, or mechanism (not shown), for retracting the landing gear 100 into the landing gear bay 150, such as a four-bar linkage or other linkage. It will also be appreciated that, in some examples, the connection 130 comprises components of a suspension system (not shown) for supporting the aircraft 10 on the landing gear 100 when the aircraft 10 is on the ground, such as during or following a landing event. In other examples, the landing gear 100 is configured to be retractable into the landing gear bay 150 in any suitable way, such as rotatably around the pivot point 131, which may be a movable pivot point 131, and/or linearly, such as without any articulation around the pivot point 131.

The landing gear 100 is shown in FIG. 2 in: an extended position A, illustrated with solid lines; an intermediate position B, illustrated with dashed lines; and a retracted position C, also illustrated with dashed lines. During and following a take-off event of the aircraft 10, the landing gear 100 is in the extended position A. The retraction process, as effected by the retraction system 300, causes the landing gear 100 to articulate around the pivot point 131 into the intermediate position B, and finally into the retracted position C, where the landing gear 100 is stowed within a landing gear bay 150.

The aircraft 10 comprises a fuselage 140, a landing gear bay door 160, and a structure 151 in the landing gear bay 150. The structure 151 is a structural component of the aircraft 10, such as a wall partially defining the landing gear bay 150, and/or a part of the landing gear bay door 60, such as a seal of the landing gear bay door 160. In other examples, the structure 151 is instead a component of an aircraft system, such as a component of the braking system 200 and/or the retraction system 300. For example, the structure 151 could comprise a hydraulic hose, an electrical cable, a power supply, or other component of the braking system 200. In any case, the landing gear 100 is configured so that a proximity 152 of the wheel 110, or a part thereof, to the structure 151 is always non-zero. That is, the wheel 110, or a part thereof, should never touch the structure 151 either before, during, or after the retraction process, as will be described in more detail hereinafter.

The landing gear bay door 160 is movably, such as pivotably, connected to the fuselage 140, or another part of the aircraft 10, such as the landing gear bay 150. In the illustrated example, the landing gear bay door 160 is pivotably connected to the fuselage 140 along an axis aligned with a longitudinal dimension of the fuselage 140. That is, the landing gear bay door 160 is pivotable to: an open position, to fully expose the landing gear bay 150 and permit movement of the landing gear 100 into and out of the landing gear bay 150; and a closed position, to at least partially cover the landing gear bay 150, such as when the landing gear 100 is contained in the landing gear bay 150 in the retracted position C.

In some examples, when the landing gear 100 is in the retracted position C, the landing gear bay door 160 is closed to provide a smooth aerodynamic surface on an underside of the aircraft 10. The landing gear bay door 160 may be in the open or the closed position when the landing gear 100 is in the extended position A. It will be appreciated that, in other examples, the landing gear door 160 is configurable in any suitable way to permit movement of the landing gear 100 into and out of the landing gear bay 150 when the landing gear bay door is in the open position, and to fully or partially cover the landing gear 100 in the landing gear bay 150 when the landing gear bay door is in the closed position.

As noted hereinbefore, the landing gear 100 is configured to pivot around the pivot point 131. In the illustrated example, a position of the landing gear 100 during the retraction process is defined as an angular position 132 of the landing gear 100 about the pivot point 131. The angular position 132 is an angular position 132a of the landing gear 100 relative to the extended position C. In other examples, the angular position 132 is an angular position 132b of the landing gear 100 relative to a critical position 170 of the landing gear 100.

The critical position 170 is a position of the landing gear 100, or a portion thereof, such as an outermost portion of the wheel (as discussed hereinafter), at which the rotating wheel 110 should be slowed to a stop, or to a rotation speed below a predetermined rotation speed threshold. Slowing the wheel 110 as such may improve a safety of the aircraft. In some examples, the critical position is defined as an angular position of the landing gear 100. In other examples, the critical position 170 is defined as a proximity of a part of the landing gear 100, such as an outermost portion of the wheel 110, to a part of the aircraft 10, such as the fuselage 140, the landing gear bay 150, and/or the structure 151.

In other examples, during the retraction process, there is a linear displacement of a part of the landing gear 100, such as a part of the connection 130, and/or an actuator of the retraction system 300. In such examples, the position of the landing gear 100 during the retraction process may be defined as a linear position of the linearly-movable part of the connection 130 and/or the actuator.

In other examples, as will be described in more detail hereinafter, the position of the landing gear 100 is defined as a position of the wheel 110. Specifically, the position is a proximity 152a of an outermost portion of the wheel 110 to the critical position 170. In other examples, the position is a proximity 152b of the outermost portion of the wheel to the structure 151, the fuselage 140, and/or another part of the aircraft 10. It will be appreciated that in other examples, the outermost portion is any other portion of the wheel 110.

Figure 3:
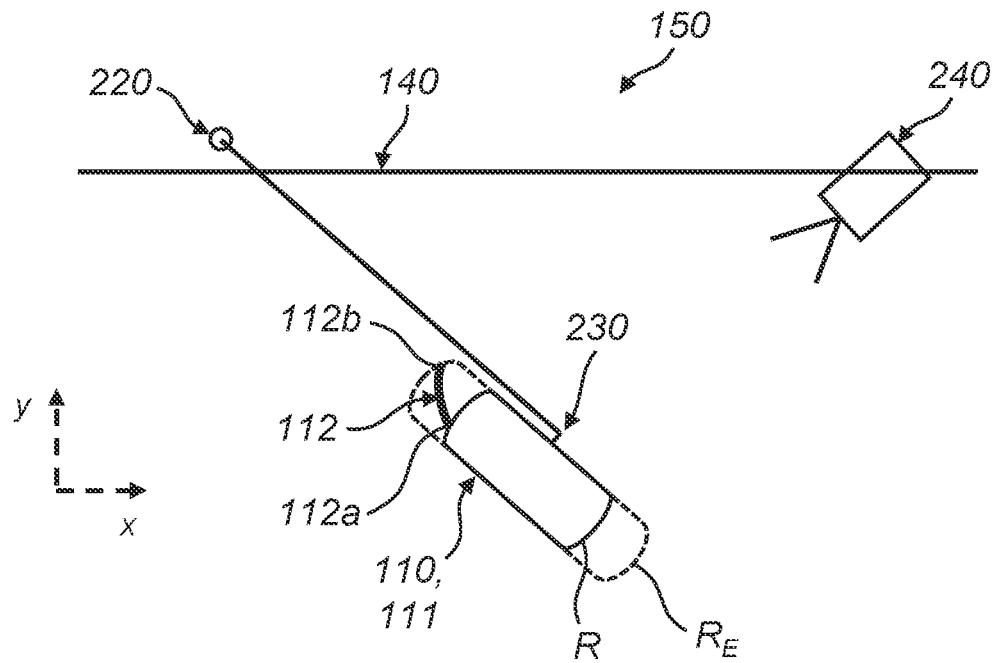
FIG. 3 shows another schematic view of the landing gear of FIG. 2.

FIG. 3 shows another schematic diagram of the landing gear 100 of the illustrated example. In contrast to FIG. 2, the landing gear bay landing gear bay 150, the landing gear bay door 160 and the structure 151 are not shown in FIG. 3, for ease of understanding.

The landing gear 100 comprises a wheel 110 comprising a tyre 111. The wheel 110, including the tyre 111, has a maximum radius R. The maximum radius R is a maximum distance between a rotation axis of the wheel 110 and an outermost portion of the tyre 111. It will be appreciated that, as the wheel 110 rotates, centrifugal forces may cause the tyre 111 to deform, increasing the maximum radius R of the wheel 110. This is represented by the "maximum effective radius" $R_E$ shown in FIG. 3. It will be appreciated that the tyre 111 is more readily deformable as a pressure of the tyre is reduced relative to an ambient pressure. As such, the maximum effective radius $R_E$ for a given angular velocity of the wheel 110 may vary between flights, or during a flight, as a pressure in the tyre 111 or in an environment surrounding the tyre varies.

In the illustrated example, the tyre 111 comprises a tyre body and a tyre portion 112 connected to the tyre body at a proximal end 112a of the tyre portion 112. In this case, a free distal end 112b of the tyre portion defines the maximum effective radius $R_E$ of the wheel 110. The distal end 112b of the tyre portion 112 is detached from the tyre body. This could occur, for example, during a take-off event of the aircraft 10, such as due to the tyre 111 contacting debris on a runway during the take-off event.

As noted hereinbefore, the controller 210 is configured to determine a position of at least a part of the landing gear 100 during retraction of the landing gear 100, and to control braking of the wheel 110 on the basis of the position determined. In this example, the controller 210 is configured to monitor the position of the landing gear 100 during retraction of the landing gear 100, and regulate, or cause regulation of, a rotational speed of the wheel 110 during the retraction.

As shown in FIG. 3, to determine the position of the landing gear 100, the braking system 200 comprises an angular position sensor 220. The angular position sensor 220 is configured to sense an angular position 132a, 132b of at least a part of the landing gear 100, as shown in FIG. 2. The angular position sensor 220 is communicatively coupled, or couplable, to the controller 210. The angular position sensor 220 is any suitable angular position sensor, such as a rotary variable differential transformer (RVDT), or a rotary optical encoder.

In some examples, as also shown in FIG. 3, the braking system 200 comprises a proximity sensor 240 configured to sense a proximity 152a, 152b of at least a part of the landing gear 100, such as an outer portion of the tyre 111, to the critical position 170, or to a part of the aircraft 10, such as the structure 151 shown in FIG. 2. In the illustrated example, the proximity sensor 240 is configured to determine a proximity 152a between the maximum effective radius $R_E$ of the wheel 110 and the critical position 170. In other examples, the proximity 152a, 152b determined by the proximity sensor 240 is a proximity 152b between the maximum effective radius $R_E$ of the wheel 110 and the part of the aircraft 10, as shown in FIG. 2, or any other distance between the wheel 110 and the part of the aircraft 10 during the retraction process. In any event, the proximity sensor 240 is communicatively coupled, or couplable, to the controller 210.

The proximity sensor 240 is any suitable proximity sensor, such as an electromagnetic proximity sensor (e.g. an infrared proximity sensor or radar system), an inductive proximity sensor, a camera, or a laser. In some examples, the proximity sensor 240 comprises a laser configured to emit a laser beam, the laser being arranged so that the landing gear 100 intersects, or interrupts, the laser beam during retraction of the landing gear 100. The interruption of the laser beam is indicative that the landing gear 100 has reached a particular landing gear position in the retraction process, such as a predetermined angular position 132a, 132b and/or proximity 152a, 152b. In other examples, the proximity sensor 240 comprises a camera configured to determine a distance between the outermost portion of the tyre 111, represented by the maximum effective radius $R_E$, and the position of the outermost portion of the tyre 111 when the landing gear 100 is at the critical position 170. As such, the proximity sensor 240 may be arranged in any suitable location and orientation to detect the proximity of the landing gear 100, or a part thereof, to the critical position, and/or to the respective part of the aircraft 10.

It will be appreciated that, in some examples, there may be more than one proximity sensor 240 and/or angular position sensor 220, such as plural RVDTs, plural cameras, and/or plural lasers for determining when the landing gear 100 passes through plural respective points in the retraction process. In other examples, the position may be a linear position, as noted hereinbefore, and the braking system 200 may comprise one or more suitable linear position sensors, such as a linear variable differential transformer (LVDT) coupled to a linkage or an actuator configured to move the landing gear 100 during the retraction process. It will also be understood that, in some examples, the angular position sensor 220 can used to infer the proximity 152a, 152b of the landing gear 100, or a part thereof, and/or the proximity sensor 240 can be configured to infer the angular position 132a, 132b of the landing gear 100, or a part thereof. Additionally, in some examples, there may be no angular position sensor 220, and/or no proximity sensor 240, and the position of the landing gear 100 may be determined by the controller 210 in any other suitable way.

In other examples, the position of the landing gear 100 is inferred by the controller 210 from an elapsed time since a start of the retraction process. In this case, the angular position sensor 220 and/or the proximity sensor 240 may not be required. That is, controller may perform an open-loop control of the braking of the wheel 110 with respect to the landing gear position. A time taken for the landing gear 100 to retract may vary with varying factors such as aerodynamic loads, braking system tolerances, and/or masses of the landing gear 100 or wheel(s) 110, but in some examples is between 1 and 6 seconds, such as between 2 and 4 seconds. As such, when performing such an open-loop control, it may be necessary to account for conservative estimates of the varying factors to ensure that the wheel is slowed sufficiently during the retraction process. For example, it may be necessary to ensure that the wheel has stopped rotating by at least 3 seconds into the retraction process. By instead performing a closed-loop control on the basis of landing gear position information received from the angular position sensor 220 and/or the proximity sensor 240, the controller 210 can provide only the amount of braking that is required at the time of the retraction process, thereby providing more accurately controlled braking of the wheel 110 and reducing power draw.

The braking system 200 in the illustrated example comprises a rotational wheel speed sensor 230 communicatively coupled or couplable to the controller 210. The rotational wheel speed sensor 230 is configured to determine a rotational speed of the wheel 110, such as during the retraction procedure. The rotational wheel speed sensor 230 is any suitable angular velocity sensor, such as a gyroscopic sensor, or an angular position sensor from which the rotational wheel speed can be inferred.

In the illustrated example, the controller 210 is configured to determine the rotational wheel speed of the wheel 110 using the rotational wheel speed sensor 230, and to determine the position of the landing gear 100 using either or both of the angular position sensor 220 and the proximity sensor 240. The controller 210 is then configured to determine a target rotational wheel speed based on the position determined. Specifically, the controller 210 is configured to determine the target rotational speed based on a predefined relationship between plural target rotational wheel speeds and plural positions of the landing gear 100.

Figure 4:
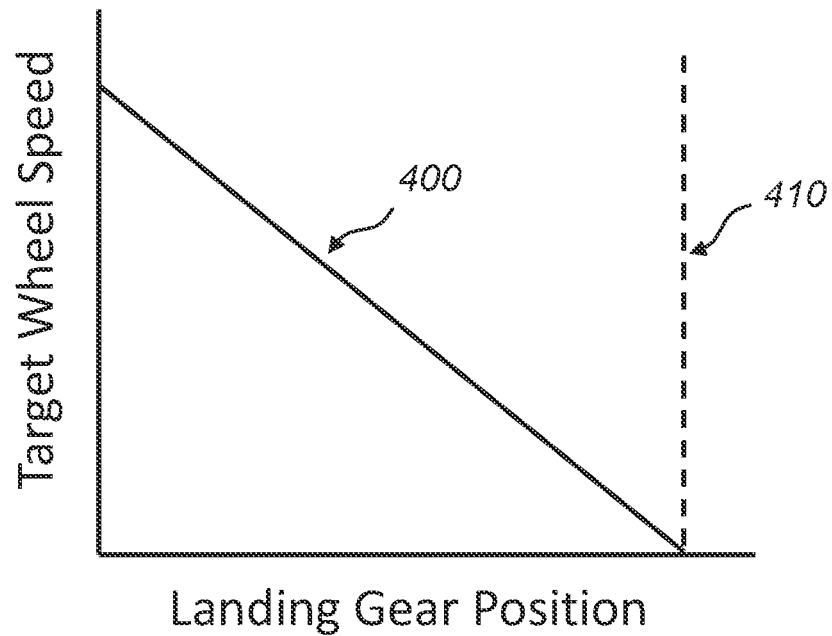
FIG. 4 shows a diagram of a relationship between plural target rotational wheel speeds and plural landing gear positions according to an example.

FIG. 4 shows an example of such a relationship 400, in which target rotational speeds decrease monotonically with the position of the landing gear 100. The relationship 400 in FIG. 4 is linear, though in some examples it may be non-linear, such as to provide a desired braking profile and/or power draw from a power supply (not shown) of the braking system 200. In any event, in the illustrated example, the target rotational speed is zero when the landing gear 100 is at the critical position 170, represented here by the line labelled 410. In other examples, the target rotational speed at the critical position 410 is non-zero, such as a predetermined threshold rotational speed.

The controller 210 is configured to determine the target rotational speed of the wheel 110 from the relationship 400 on the basis of the landing gear 100 position sensed by the angular position sensor 220 and/or the proximity sensor 240. The controller 210 is then configured to compare the rotational speed of the wheel 110, as determined from the wheel speed sensor 230, with the target rotational speed determined from the relationship 400. The comparison is, specifically, a difference, or in some examples a ratio, between the target rotational speed and the rotational speed of the wheel 110 determined by the controller 210.

The controller 210 is then configured to control, or regulate, the braking of the wheel 110 based on the comparison. In the present example, the controller 210 is configured to control a braking force applied to the wheel 110 to reduce the difference or ratio between the measured rotational speed of the wheel 110 and the target rotational speed. That is, the controller 210 is configured to slow the wheel 110, during the retraction process, towards the target rotational speed of the wheel. In other words, the controller is configured 210 to perform a closed-loop control of the rotational speed of the wheel 110 by comparing the rotational speed of the wheel 110, as measured by the rotational wheel speed sensor 230, with the target rotational speed.

To control the braking of the wheel 110, the controller 210 is configured to control a braking force applied by the braking system 200 to a brake associated with the wheel 110. In some examples, this is by the controller 210 controlling a power supplied to the brake from a power supply (not shown) of the braking system 200. The power supply is an electric or hydraulic power supply 200, depending on the type of braking system 200 in use on the aircraft 10.

In some examples, the controller 210 is configured to set the critical position 170, 410 based on a status of the landing gear 100. In some examples, the braking system 200 comprises a tyre pressure sensor (not shown) configured to sense a pressure in the tyre 111. In the event a reduction of a pressure in the tyre 111, the maximum effective radius $R_E$ of the tyre may increase, as noted hereinbefore. As such, to avoid any contact between the tyre 111 and a part of the aircraft 10, such as the structure 151, the controller 100 may set a lower critical position 410 in the relationship 400, such as by moving the critical position 410 to the left in FIG. 4, and/or may change the target rotational wheel speed, such as by varying a shape of the relationship 400, for example so that more braking is applied earlier in the retraction event. That is, in some examples, the controller 100 is configured to set, or vary how the target rotational wheel speed varies as a function of the landing gear position in the relationship 400, and/or to set, or vary, the critical position 410 in the relationship 400, as a function of the pressure in the tyre 111. In another example, if a proximity sensor 240, such as a camera 240, detects the presence of a defect on the tyre 111, such as the tyre portion 112, the relationship 400 and/or the critical position 410 may be similarly varied. In other words, in some examples, the controller is configured to vary the relationship 400, and/or to define a new relationship 400, between target rotational wheel speeds and landing gear positions, on the basis of a status of the wheel 110 and/or the tyre 111.

In other examples, the controller 110 is configured to control the braking of the wheel 110 based on the position of the landing gear 100 without taking into account the rotational speed of the wheel 110 as measured by the rotational wheel speed sensor 230. In such a case, the controller 210 may be configured to apply a fixed amount of braking on the basis of the position of the landing gear 100, such as to ensure the rotational speed of the wheel 110 is below a predetermined threshold rotational speed when the landing gear 100 is at the critical position 170. Such open-loop control of the rotational speed of the wheel 110 may be less accurate than the closed-loop control based on the sensed rotational speed described hereinbefore. Specifically, a closed-loop control of the braking of the wheel 110 based on the rotational speed of the wheel 110 may lead to reduced power draw from the braking system 200 when compared to such open-loop control.

It will be appreciated, however, that the open-loop control may be performed without receiving information from one or more of the sensors described herein. In this way, the controller 110 may be configured to perform such open-loop control in the event of a failure of one or more of the sensors, such as the angular position sensor 220, the proximity sensor 240 and/or the wheel speed sensor 230.

Figure 5:
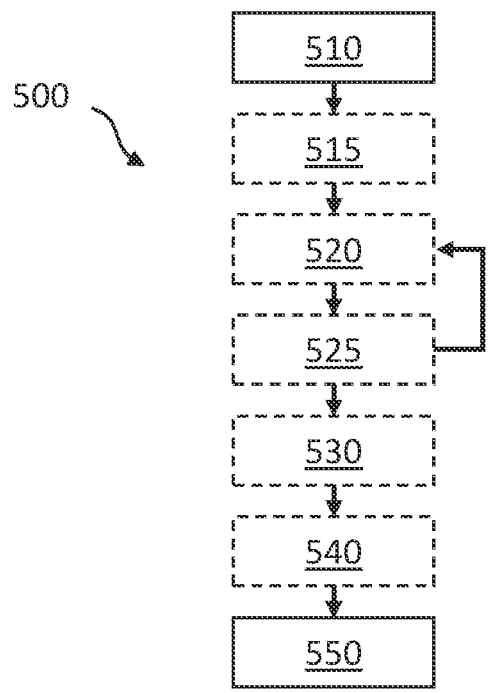
FIG. 5 shows a schematic diagram of a method according to an example.

FIG. 5 shows an example method 500 of operating a controller of an aircraft system of the aircraft 10. In the following example, the method 500 is described in relation to operating the controller 210 of the braking system 200 shown in FIG. 1, though the method 500 can also be performed by any other suitable controller such as any variant of the controller 210 discussed herein.

The method 500 comprises determining 510 a position of at least a part of the landing gear 100 during retraction of the landing gear 100, and controlling 550 braking of the wheel 110 of the landing gear 100 based on the position determined 510. In the illustrated example, the method 500 further comprises determining 515 a status of a component of the landing gear, such as a status of the wheel, such as a status of a tyre of the wheel, as described hereinbefore. The method 500 further comprises determining 520 a target rotational speed of the wheel 110 based on the position determined 510 and/or the status determined 515. This is, in the illustrated example, by determining 520 the target rotational speed on the basis of a predefined relationship between plural target rotational wheel speeds and plural positions of the landing gear. The method 500 also comprises varying 525 the relationship (which may, in some examples, comprise determining a new relationship, as described hereinbefore) based on the status of the component of the landing gear. The varied 525 relationship can then be used to determine 520 the target rotational wheel speed, as illustrated in FIG. 5. The method 500 also comprises determining 530 a rotational speed of the wheel 110 during the retraction and comparing 540 the target rotational speed with the rotational speed of the wheel determined 530. In some examples the method 500 comprises any one or more of the actions performed by the controller 210 described hereinbefore. It will be appreciated that the order of the actions of the method 500 shown in FIG. 5 is not intended to be limiting. For example, in some examples, the determining 520 the target rotational speed is performed before, or concurrently with, the determining 510 the position of the at least the part of the landing gear 100, or is performed after or concurrently with the determining 530 the rotational speed of the wheel 110.

Figure 6:
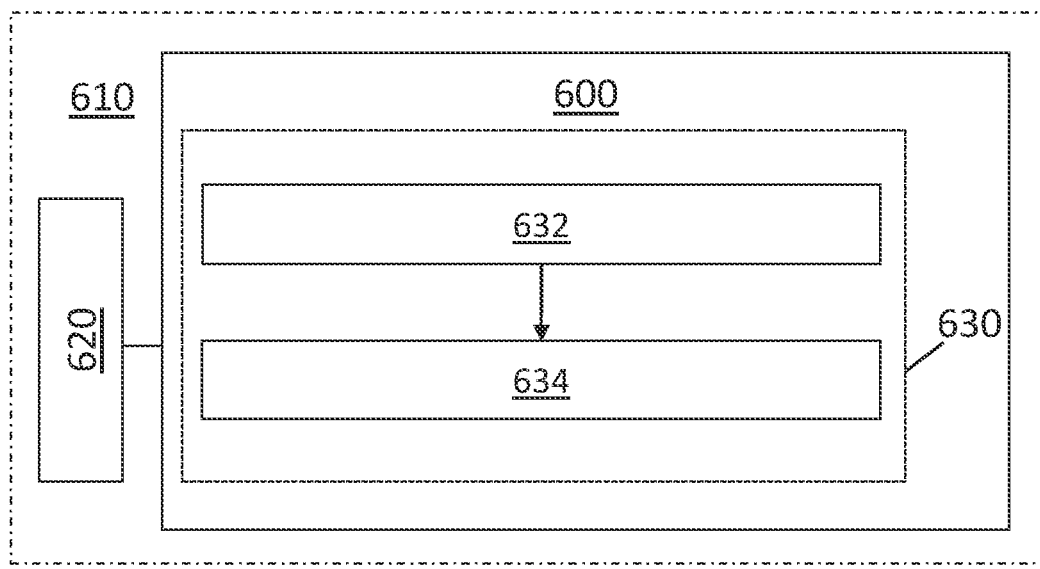
FIG. 6 shows a schematic a non-transitory computer-readable storage medium according to an example.

FIG. 6 shows a schematic diagram of a non-transitory computer-readable storage medium 600 according to an example. The non-transitory computer-readable storage medium 600 stores instructions 630 that, if executed by a processor 620 of a controller 610, cause the processor 620 to perform a method according to an example. In some examples, the controller 610 is the controller 210 as described hereinbefore, or any variation thereof discussed herein. The instructions 630 comprise determining 632 a position of at least a part of the landing gear 100 during retraction of the landing gear 100, and controlling 634 braking of the wheel 110 of the landing gear 100 based on the position determined 632. In other examples, the instructions 330 comprise instructions to perform any other example method described herein, such as the method 500 described above with reference to FIG. 5.

In the illustrated example described herein, a rotational speed of each of the wheels 110a-110c of each landing gear 100a-100c is considered individually, and each of the wheels 110a-110c is braked individually towards the target rotational speed. It will be understood that, in other examples, the wheels 110a-110c of the respective landing gears 100a-100c may be considered and braked in pairs, or in larger groups. In some examples, all of the wheels 110a-110c on a single landing gear 100a-100c are considered and braked together, such as braked with the same braking force.

It is to be noted that the term "or" as used herein is to be interpreted to mean "and/or", unless expressly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, and the terms "a" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft braking controller for an aircraft, the aircraft braking controller configured to:
   determine a plurality of positions of at least a part of a landing gear of the aircraft during retraction of the landing gear;
   determine, for each of the positions, a rotational speed of a wheel attached to the landing gear while the at least part of the landing gear is at the position; and
   apply closed loop control that sequentially for each of the positions:
      applies the position to a relationship between positions of the at least part of the landing gear and wheel rotational speeds to determine a threshold rotational speed corresponding to the position, wherein the rotational speeds in the relationship vary with the positions, and
      compares the threshold rotational speed to the rotational speed associated with the position; and
   based on the comparison, cause braking of the wheel to adjust the rotational speed of the wheel.

2. The aircraft braking controller of claim 1, configured to control the braking of the wheel of the landing gear based on a determined status of a component of the landing gear.

3. The aircraft braking controller of claim 2, wherein the threshold rotational speed is further determined based on the determined status.

4. The aircraft baking controller of claim 2, configured to vary the relationship on the basis of the determined status of the component of the landing gear.

5. An aircraft braking system, comprising:
   the aircraft braking controller according to claim 1; and
   one or more sensors for sensing the positions of the at least the part of the landing gear during the retraction of the landing gear;
   wherein the aircraft braking controller is configured to determine the positions on the basis of landing gear position information received from the one or more sensors.

6. The aircraft braking system of claim 5, wherein the positions of the at least the part of the landing gear are positions of a portion of the wheel, and
   wherein the one or more sensors are configured to sense the position of the portion of the wheel.

7. The aircraft braking system of claim 6, wherein the portion of the wheel defines a maximum radius of the wheel.

8. The aircraft braking system of claim 5, wherein the one or more sensors comprise at least one of:
   an angular position sensor configured to sense an angular position of the part of the landing gear;
   a linear position sensor configured to sense a linear position of the part of the landing gear;
   a proximity sensor;
   an infrared sensor;
   a laser, and
   a camera.

9. A method of controlling braking of a wheel of a landing gear of an aircraft, the method comprising:
   determining a plurality of positions of at least a part of the landing gear during retraction of the landing gear;
   determining, for each of the positions, a rotational speed of a wheel attached to the landing gear while the at least part of the landing gear is at the position; and
   applying closed loop control that sequentially for each of the positions:
      applies the position to a relationship between positions of the at least part of the landing gear and wheel rotational speeds to determine a threshold rotational speed corresponding to the position, wherein the rotational speeds in the relationship vary with the positions, and compares the threshold rotational speed to the rotational speed associated with the position; and based on the comparison, controlling braking of the wheel to adjust the rotational speed of the wheel.

10. The method of claim 9, wherein the step of controlling the braking is also based on a determined status of a component of the landing gear.

11. The method of claim 10, wherein the controller is configured to determine the target rotational speed on the basis of a predefined relationship between plural target rotational wheel speeds and plural positions of the landing gear.

12. The method of claim 11, wherein the control the braking of the wheel of the landing gear is also based on a determined status of a component of the landing gear, and configured to vary the predefined relationship on the basis of the status of the component of the landing gear.

13. A non-transitory computer-readable storage medium storing instructions that, when executed by a processor of an aircraft braking controller, cause the processor to perform the method of claim 9.

14. An aircraft comprising:

the aircraft braking controller according to claim 1, and the landing gear.

* * * * *